(12) United States Patent
Takahashi et al.

(10) Patent No.: US 9,648,675 B2
(45) Date of Patent: *May 9, 2017

(54) LIGHTING SOURCE AND LIGHTING APPARATUS

(71) Applicant: PANASONIC CORPORATION, Osaka (JP)

(72) Inventors: Akira Takahashi, Osaka (JP); Kazuhiro Takeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 138 days.

This patent is subject to a terminal disclaimer.

(21) Appl. No.: 14/458,511

(22) Filed: Aug. 13, 2014

(65) Prior Publication Data

US 2015/0077002 A1 Mar. 19, 2015

(30) Foreign Application Priority Data

Sep. 13, 2013 (JP) ................................. 2013-190990

(51) Int. Cl.
*H05B 37/02* (2006.01)
*H05B 33/08* (2006.01)

(52) U.S. Cl.
CPC ..... *H05B 33/0815* (2013.01); *H05B 33/0803* (2013.01); *H05B 33/0809* (2013.01);
(Continued)

(58) Field of Classification Search
CPC .... H05B 37/00; H05B 37/02; H05B 33/0803; H05B 33/0809; H05B 33/0815; H05B 33/0821; H05B 33/0857; H01L 33/00
(Continued)

(56) References Cited

U.S. PATENT DOCUMENTS 8,427,037 B2 * 4/2013 Liang ........................ F21S 8/04
313/113
8,847,516 B2 * 9/2014 Chobot ................ H05B 33/083
315/210
(Continued)

FOREIGN PATENT DOCUMENTS

DE 202010005328 11/2010
JP 2006-210836 8/2006
(Continued)

OTHER PUBLICATIONS

German Office Action, mailed Apr. 16, 2015, for the corresponding German Patent Application No. 102014111743.3 (together with the English language translation thereof).

(Continued)

*Primary Examiner* — Jimmy Vu
(74) *Attorney, Agent, or Firm* — Greenblum & Bernstein, P.L.C.

(57) ABSTRACT

An LED lamp according to one aspect of the present invention includes: a first LED array that is annularly arranged on a mounting board and includes first LED elements connected in series; a second LED array that is arranged within an inner circumference of the first LED array on the mounting board, includes second LED elements connected in series, and emits light having an emission color different from an emission color of the first LED array; a FET switch arranged in series on a path through which current flows to the second LED array; and a constant power output circuit, wherein the number of the first LED elements is greater than the number of the second LED elements, and a total forward voltage of the first LED array is greater than a total forward voltage of the second LED array.

11 Claims, 11 Drawing Sheets

(52) U.S. Cl.
CPC ..... *H05B 33/0821* (2013.01); *H05B 33/0857* (2013.01); *Y02B 20/383* (2013.01)

(58) Field of Classification Search
USPC ......... 315/119–125, 185 R, 209 R, 291, 307, 315/308, 312
See application file for complete search history.

(56) References Cited

U.S. PATENT DOCUMENTS

| | | | |
|---|---|---|---|
| 9,271,354 B2* | 2/2016 | Takahashi | H05B 33/0803 |
| 2008/0224025 A1 | 9/2008 | Lyons et al. | |
| 2012/0200229 A1 | 8/2012 | Kunst et al. | |
| 2014/0225525 A1 | 8/2014 | Lin | |
| 2015/0077001 A1* | 3/2015 | Takahashi | H05B 33/0803 315/193 |

FOREIGN PATENT DOCUMENTS

| | | |
|---|---|---|
| JP | 2007-59260 | 3/2007 |
| JP | 2009-009782 | 1/2009 |
| JP | 2009-9817 | 1/2009 |
| JP | 2012-113959 | 6/2012 |

OTHER PUBLICATIONS

German Office Action, mailed Sep. 10, 2015, for the corresponding German Patent Application No. 102014111743.3 (together with the English language translation thereof).

Office Action issued in Japan Counterpart Patent Appl. No. 2013-190990, dated Feb. 21, 2017.

* cited by examiner

US 9,648,675 B2

LIGHTING SOURCE AND LIGHTING APPARATUS

CROSS REFERENCE TO RELATED APPLICATION

This application claims the benefit of priority of Japanese Patent Application Number 2013-190990, filed Sep. 13, 2013, the entire content of which is hereby incorporated by reference.

TECHNICAL FIELD

The disclosure relates to a lighting source including light-emitting elements such as light-emitting diodes (LEDs), and to a lighting apparatus including the lighting source.

BACKGROUND ART

In recent years, a lighting apparatus using a light-emitting module including semiconductor light-emitting elements such as LEDs has gained in popularity as a substitute for an incandescent light bulb. In general, a change in level of current flowing through an LED chip does not change the emission color of the LED chip. This is because the emission color of the LED chip depends on the bandgap of a semiconductor material included in the LED chip, but does not depend on the current level.

In view of the above, Patent Literature (PTL) 1 (Japanese Unexamined Patent Application Publication No. 2009-09782) discloses an LED module which is capable of changing the emission color in the use of the LEDs.

FIG. 10 is a circuit diagram of a conventional LED module disclosed in PTL 1. As shown in FIG. 10, the LED module 900 includes a red LED array 921 and a white LED array 922 which are connected in parallel. The red LED array 921 includes red LEDs 921a, 921b, 921c, . . . , 921d, 921e, and 921f which are connected in series. The white LED array 922 includes white LEDs 922a, 922b, . . . , 922c, and 922d which are connected in series. The white LED array 922 is connected in series to a bipolar transistor 924 and a resistive element 926. The bipolar transistor 924 has a base terminal connected to a variable voltage source 927 via a resistive element 925. Furthermore, the bipolar transistor 924 has a collector terminal connected to the cathode terminal of the white LED 922d, and an emitter terminal connected to the resistive element 926.

The LED module 900 is connected to a variable current source 933. Alternating-current (AC) power supplied from an AC source 931 undergoes AC to DC conversion performed by an AC/DC converter 932, and the resulting power is supplied to the variable current source 933. Accordingly, current is supplied to the LED module 900 from the variable current source 933.

The LED module 900 is capable of changing base current by changing base-emitter voltage of the bipolar transistor 924. Here, the collector current increases as the base current of the bipolar transistor 924 increases. This leads to an increase in current flowing through the white LED array 922. By increasing the current flowing through the white LED array 922 among the current supplied from the variable current source 933, the current flowing through the red LED array 921 relatively decreases. As a result, the emission color of the LED module 900 approaches white. On the other hand, by reducing the current flowing through the white LED array 922, the current flowing through the red LED array 921 relatively increases. As a result, the emission color of the LED module 900 approaches orange.

SUMMARY

The LED module disclosed in PTL 1, however, has a configuration for changing the emission color of the LED module 900 according to light adjustment, and is incapable of switching between only the emission colors without changing brightness and power consumption.

The present invention has been conceived in view of the above problem, and an object of the present invention is to provide a lighting source and a lighting apparatus that are capable of switching between emission colors without changing the brightness and the power consumption.

In order to achieve the above object, a lighting source according to one aspect of the present invention includes: a board; a first light-emitting unit annularly arranged on the board and including a plurality of first light-emitting elements connected in series; a second light-emitting unit arranged within an inner circumference of the first light-emitting unit on the board and including a plurality of second light-emitting elements connected in series, the second light-emitting unit being configured to emit light having a different emission color from an emission color of the first light-emitting unit; a first switch element arranged in series on, among a first current path through which current flows to the first light-emitting unit and a second current path through which current flows to the second light-emitting unit, the second current path; and a constant power output circuit that outputs power to the first light-emitting unit and the second light-emitting unit without changing a total value of the power supplied to the first light-emitting unit and the second light-emitting unit between before and after conduction and non-conduction of the first switch element are switched, wherein the number of the plurality of first light-emitting elements connected in series is greater than the number of the plurality of second light-emitting elements connected in series, and a first total forward voltage is greater than a second total forward voltage, the first total forward voltage being a voltage value obtained by adding a forward voltage of each and every one of the plurality of first light-emitting elements connected in series, and the second total forward voltage being a voltage value obtained by adding a forward voltage of each and every one of the plurality of second light-emitting elements connected in series.

Moreover, in the lighting source according to another aspect of the present invention, the forward voltage of each of the plurality of first light-emitting elements may be equal to the forward voltage of each of the plurality of second light-emitting elements, each first light-emitting element and each second light-emitting element may include, on respective surfaces thereof, phosphors different from each other, and the first light-emitting unit may have lower luminous efficiency than the second light-emitting unit does.

Furthermore, in the lighting source according to another aspect of the present invention, an amount of light emission of the first light-emitting unit may be equal to an amount of light emission of the second light-emitting unit.

Moreover, in the lighting source according to another aspect of the present invention, the plurality of first light-emitting elements and the plurality of second light-emitting elements each may include: an LED chip that emits light by current flowing therethrough; an electrostatic breakdown protection element connected in parallel to the LED chip; a phosphor around the LED chip; and a package containing the LED chip and the electrostatic breakdown protection element, the electrostatic breakdown protection element of each of the plurality of first light-emitting elements may be disposed in an outer circumferential direction relative to the LED chip of each of the plurality of first light-emitting elements, and the electrostatic breakdown protection element of each of the plurality of second light-emitting elements may be disposed in an inner circumferential direction relative to the LED chip of each of the plurality of second light-emitting elements.

Furthermore, in the lighting source according to another aspect of the present invention, the first switch element may be connected in series either one of between a first anode terminal of the first light-emitting unit and a second anode terminal of the second light-emitting unit and between a first cathode terminal of the first light-emitting unit and a second cathode terminal of the second light-emitting unit, and the constant power output circuit may have a negative output terminal connected to the first cathode terminal and either one of the second cathode terminal and the first switch element connected to the second cathode terminal, and a positive output terminal connected to the first anode terminal and either one of the second anode terminal and the first switch element connected to the second anode terminal.

Moreover, in the lighting source according to another aspect of the present invention, the first current path may bypass the first switch element, the second current path may pass through the first switch element, if the first switch element is in a non-conduction state, the constant power output circuit may supply the power only to the first light-emitting unit among the first light-emitting unit and the second light-emitting unit, and if the first switch element is in a conduction state, the constant power output circuit may supply main power to the second light-emitting unit.

Furthermore, in the lighting source according to another aspect of the present invention, the first total forward voltage and the second total forward voltage may have a difference of at least 4 V, and if the first switch element is in the conduction state, the constant power output circuit may supply the power only to the second light-emitting unit among the first light-emitting unit and the second light-emitting unit.

Moreover, in the lighting source according to another aspect of the present invention, the first total forward voltage and the second total forward voltage may have a difference of at least 2 V but less than 4 V, and if the first switch element is in the conduction state, the constant power output circuit may supply the main power to the second light-emitting unit, and power less than the main power to the first light-emitting unit.

Furthermore, in the lighting source according to another aspect of the present invention, the constant power output circuit may include: an inductor that is connected in parallel to the first light-emitting unit and in parallel to a series-connected portion of the second light-emitting unit and the first switch element; a second switch element connected in series to the inductor between a positive input terminal and a negative input terminal of the constant power output circuit; and an oscillation control unit configured to control conduction and non-conduction of the second switch element, if the second switch element is in a conduction state, the inductor may be charged with current flowing from a power source to the inductor, and if the second switch element is in a non-conduction state, magnetic energy stored in the inductor by the charging may be released to either one of the first light-emitting unit and the second light-emitting unit.

Moreover, in the lighting source according to another aspect of the present invention, the first light-emitting unit may have an emission color that is incandescent color, and the second light-emitting unit may have an emission color that is daylight color.

Furthermore, a lighting apparatus according to another aspect of the present invention includes the lighting source described above.

According to a lighting source and a lighting apparatus of an embodiment of the present invention, since, among light-emitting units each having a different emission color, a light-emitting unit having a greater number of light-emitting elements connected in series has a greater total forward voltage, a first switch element switches between current paths of the light-emitting units, and a constant power output circuit supplies constant power to the light-emitting units, it is possible to switch between emission colors without changing brightness and power consumption. Moreover, since, among two light-emitting units, a first light-emitting unit having a greater number of light-emitting elements connected in series is annularly provided in an outer circumference region on a board, light distribution adjustment is made readily, and an optical mechanism can be simplified.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION (Underlying Knowledge Forming Basis of the Present Invention)

In relation to the conventional LED lamp disclosed in the Background Art section, the inventors have found the following problem.

The LED module disclosed in PTL 1 has a configuration for changing the emission color of the LED module 900 according to light adjustment, and is incapable of switching between only the emission colors without changing brightness and power consumption. In contrast, a configuration of a lighting source as illustrated in FIG. 11 is given as a lighting source capable of switching between emission colors without light adjustment.

Figure 11:
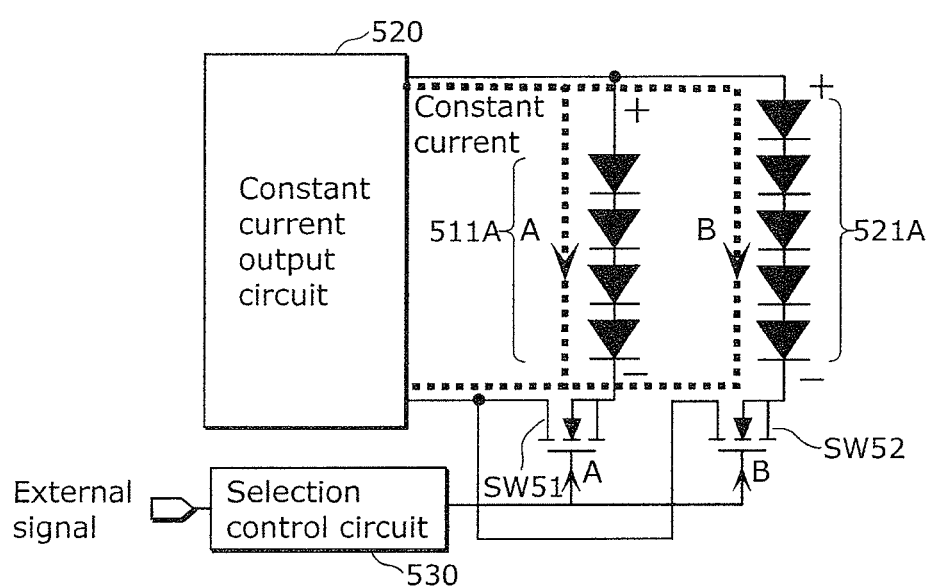
FIG. 11 is a diagram illustrating a configuration of a conventional lighting source capable of switching between emission colors.

FIG. 11 is a diagram illustrating the configuration of the conventional lighting source capable of switching between emission colors. The conventional lighting source illustrated in FIG. 11 includes LED arrays 511A and 521A, FET switches SW51 and SW52, a constant current output circuit 520, and a selection control circuit 530. The LED arrays 511A and 521A each are an array having LEDs connected in series, and have a different emission color. The constant current output circuit 520 is a back converter, for instance, and passes a constant current through one of the LED arrays 511A and 521A if the selection control circuit 530 switches between paths in each of which the constant current flows. In the above configuration, to switch between the emission colors, that is, to switch a current path from one of the LED arrays 511A and 521A to the other of the LED arrays 511A and 521A, it is necessary to exclusively switch between ON and OFF of the FET switches SW51 and SW52 respectively provided in wiring lines of the LED arrays 511A and 521A.

Unfortunately, the following problem occurs if the emission color is switched in the above configuration using the constant current output circuit 520. In general, as a method for making the emission color of each of the LED arrays 511A and 521A different, the emission color is changed by making, while the LED arrays 511A and 521A have the same chip specification, phosphors on the chips different. In this case, the problem occurs that brightness changes when the current path is switched due to a difference in efficiency of the phosphors even if the LED arrays 511A and 521A have the same number of the chips and a constant current is passed. Moreover, if the numbers of the chips of the LED arrays 511A and 521A are varied to prevent the variation in the brightness, the LED arrays 511A and 521A have the same current but differ in generated voltage. If the constant current is passed from the constant current output circuit 520 in this configuration, the problem occurs that the power consumption varies.

In order to solve such a problem, a lighting source according to one aspect of the present invention includes: a board; a first light-emitting unit annularly arranged on the board and including a plurality of first light-emitting elements connected in series; a second light-emitting unit arranged within an inner circumference of the first light-emitting unit on the board and including a plurality of second light-emitting elements connected in series, the second light-emitting unit being configured to emit light having a different emission color from an emission color of the first light-emitting unit; a first switch element arranged in series on, among a first current path through which current flows to the first light-emitting unit and a second current path through which current flows to the second light-emitting unit, the second current path; and a constant power output circuit that outputs power to the first light-emitting unit and the second light-emitting unit without changing a total value of the power supplied to the first light-emitting unit and the second light-emitting unit between before and after conduction and non-conduction of the first switch element are switched, wherein the number of the plurality of first light-emitting elements connected in series is greater than the number of the plurality of second light-emitting elements connected in series, and a first total forward voltage is greater than a second total forward voltage, the first total forward voltage being a voltage value obtained by adding a forward voltage of each and every one of the plurality of first light-emitting elements connected in series, and the second total forward voltage being a voltage value obtained by adding a forward voltage of each and every one of the plurality of second light-emitting elements connected in series.

According to this aspect, since, among the light-emitting units each having the different emission color, the light-emitting unit having the greater number of the light-emitting elements connected in series has the greater total forward voltage, the first switch element switches between the current paths of the light-emitting units, and the constant power output circuit supplies the constant power to the light-emitting units, it is possible to switch between the emission colors without changing brightness and power consumption. Moreover, since, among the two light-emitting units, the first light-emitting unit having the greater number of the light-emitting elements connected in series is annularly provided in an outer circumference region on the board, light distribution adjustment is made readily, and an optical mechanism can be simplified.

Hereinafter, a lighting source and a lighting apparatus according to embodiments of the present invention are described with reference to the drawings. Each of the embodiments to be described below shows a specific example of the present invention. The numerical values, shapes, materials, structural elements, the arrangement and connection of the structural elements, etc. shown in the following embodiments are mere examples, and therefore do not limit the scope of the present invention. Therefore, among the structural elements in the following embodiments, structural elements not recited in any one of the independent claims are described as arbitrary structural elements.

It is to be noted that each of the drawings is a schematic diagram, and is not strictly illustrated. Moreover, the same reference signs are assigned to the same structural components in each drawing.

Embodiment 1

Configuration of Lighting Apparatus

Figure 1:
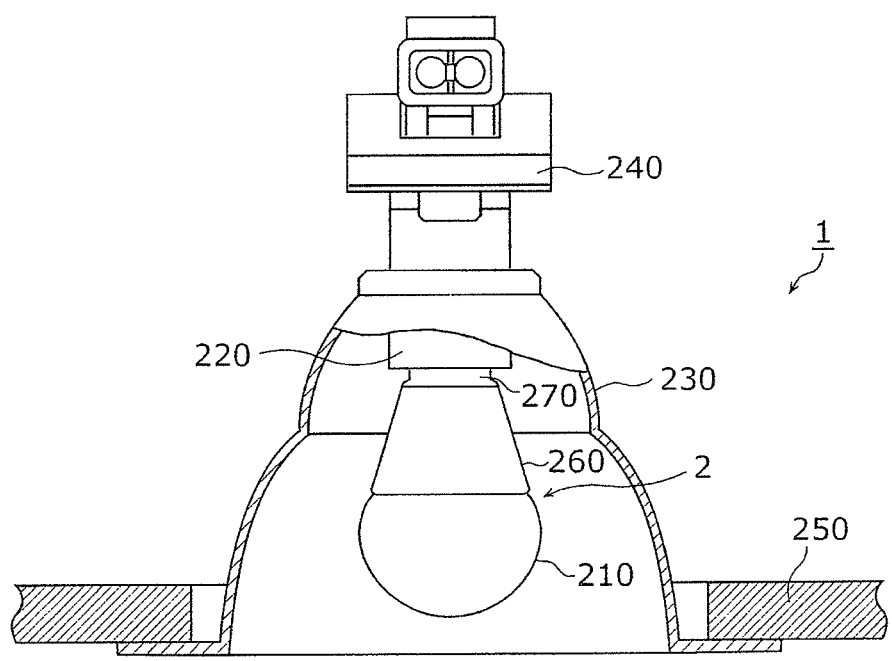
FIG. 1 is a cross-sectional view of a lighting apparatus including an LED lamp according to Embodiment 1.

FIG. 1 is a cross-sectional view of a lighting apparatus including an LED lamp according to Embodiment 1. As shown in FIG. 1, an LED lamp 2 is attached to a lighting apparatus 1. The LED lamp 2 is a lighting source that includes a globe 210, an outer case 260, and a base 270, and houses an LED module 10 (not shown in FIG. 1). Furthermore, a selection control circuit that switches between switch elements according to an external signal, and a constant power output circuit (not shown in FIG. 1) that supplies constant power to the LED module 10, are provided inside the outer case 260 and the base 270. With this configuration, the constant power is supplied to an LED array selected according to the external signal, and the LED lamp 2 emits light having the emission color of the selected LED array.

The lighting apparatus 1 includes: the LED lamp 2, a socket 220 which is electrically connected to the LED lamp 2 and which holds the LED lamp 2; and a bowl-shaped reflective plate 230 which reflects light emitted from the LED lamp 2 into a predetermined direction. As an example of the lighting apparatus 1 according to Embodiment 1, a so-called downlight lighting appliance is shown.

The lighting apparatus 1 is connected to an external AC source via a connecting portion 240. The reflective plate 230 is attached to a ceiling 250 while the reflective plate 230 abuts the lower surface of the peripheral portion of the opening of the ceiling 250. The socket 220 provided above the reflective plate 230 is located at the back side of the ceiling 250.

Note that the configuration of the lighting apparatus 1 shown in FIG. 1 is a mere example, and the lighting apparatus 1 is not limited to the above downlight lighting appliance.

[Configuration of LED Module]

Figure 2:
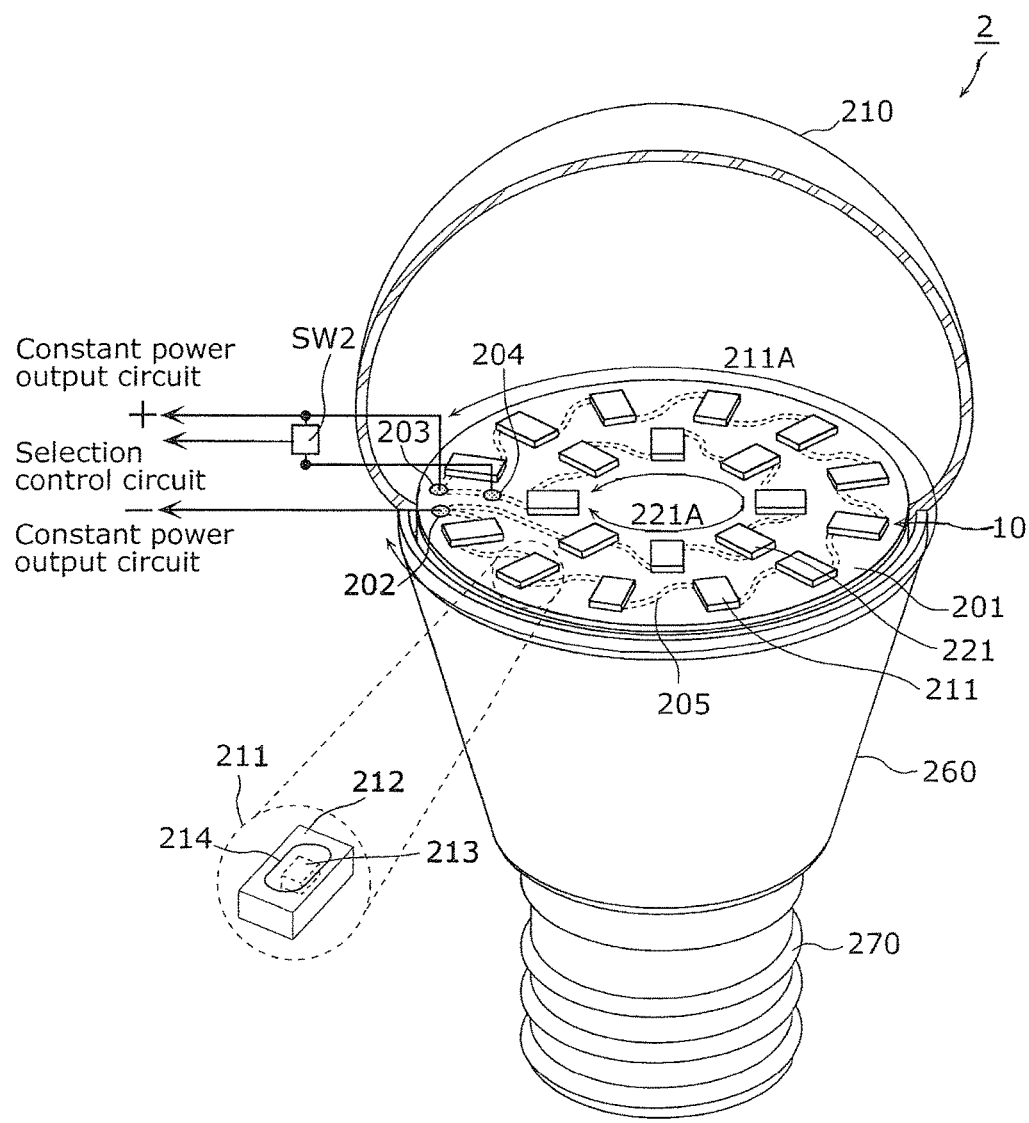
FIG. 2 is a perspective view of an LED module in the LED lamp according to Embodiment 1.

FIG. 2 is a perspective view of an LED module in the LED lamp according to Embodiment 1. An LED lamp 2 shown in FIG. 2 is attached to the lighting apparatus 1 shown in FIG. 1.

In the LED lamp 2, an upper surface of an approximately ring shaped base platform serves as a mounting board 201 on which LED elements 211 and LED elements 221 that are surface-mount devices (SMDs) are mounted. As shown in FIG. 2, the LED module 10 is a light-emitting module including: the mounting board 201; an LED array 211A; an LED array 221A having a different emission color from an emission color of the LED array 211A; and a FET switch SW2.

It is to be noted that although the FET switch SW2 is not provided on the mounting board 201 in FIG. 2, the FET switch SW2 may be mounted on the mounting board 201, the back surface of the mounting board 201, or the like. Alternatively, as shown in FIG. 2, the FET switch SW2 may be provided inside the outer case 260 and the base 270 via lead wires connected to connection terminals 203 and 204 on the mounting board 201.

The LED array 211A is a first light-emitting unit including LED elements 211 connected in series and annularly arranged in an outer circumference region on the mounting board 201. The LED array 221A is a second light-emitting unit including LED elements 221 connected in series and arranged in an inner circumference region on the mounting board 201. Each of the LED elements 211 that are the SMDs includes a resin package (container) 212, an LED chip 213 mounted in the recess of the package 212, and a sealing component (phosphor-containing resin) 214 sealed in the recess. It is to be noted that each of the LED elements 221 that are the SMDs has the same configuration as the LED element 211. Each LED element 211 is, for instance, a first light-emitting element which includes the LED chip 213 having a forward voltage Vf of 3 V and the sealing component 214 containing an orange phosphor (with a color temperature of 2700 K) and which emits light having incandescent color. Each LED element 221 is, for instance, a second light-emitting element which includes the LED chip 213 having a forward voltage Vf of 3 V and the sealing component 214 containing a white phosphor (with a color temperature of 6500 K) and which emits light having daylight color. It is to be noted that the sealing component is made of, for instance, a translucent material such as silicon resin, and a phosphor.

Here, a first total forward voltage that is a voltage value obtained by adding a forward voltage of each and every one of the LED elements 211 connected in series is greater than a second total forward voltage that is a voltage value obtained by adding a forward voltage of each and every one of the LED elements 221 connected in series. In this embodiment, the forward voltages of the LED elements 211 are equal to those of the LED elements 221, and the number of the LED elements 211 connected in series (twelve) is greater than that of the LED elements 221 connected in series (eight). In other words, the LED arrays differ in total forward voltage, and in amount of voltage drop in the case where current flows through each of the LED arrays. With this, it is possible to selectively pass current to, among current paths of current flowing through the LED arrays, a current path having a small amount of voltage drop.

A first current path passing through the LED array 211A bypasses the FET switch SW2, and a second current path passing through the LED array 221A passes through the FET switch SW2. With this configuration, if the FET switch SW2 is in a non-conduction state, the constant power output circuit 20 supplies power only to the LED array 211A, and if the FET switch SW2 is in a conduction state, the constant power output circuit 20 supplies power to the LED array 221A.

It is to be noted that although FIG. 2 illustrates the twelve LED elements 211 and the eight LED elements 221, the numbers of the LED elements are not limited to these. The LED array 211A and the LED array 221A may differ in an emission light as a difference in configuration between the LED array 211A and the LED array 221A, and their difference in total forward voltage (hereinafter may be referred to as total Vf) obtained by serial addition of forward voltages Vf of respective LED chips may be a forward voltage Vf of substantially one LED chip, e.g. approximately 2.5 V or higher. This will be described later with reference to FIG. 5A and FIG. 5B.

The mounting board 201 is an LED mounting board which has at least a surface including an insulating material and on which LED elements are mounted. The mounting board 201 is a circular board, for instance. Examples of the mounting board 201 include a glass epoxy board (CEM-3, FR-4, and so on), a board including paper phenol or paper epoxy (FR-1 or the like), a flexible board including polyimide or the like and having flexibility, and a metal base board. Examples of the metal base board include an aluminum alloy board having an insulating film on a surface, an iron alloy board, and a copper alloy board. The front surface and the back surface of the mounting board 201 are circular when viewed planarly. Moreover, to enhance reflectivity and protect wiring, a white resist may be applied to the front surface of the mounting board 201.

The mounting board 201 has a wiring pattern 205 which allows wiring to be connected to the LED elements 211 and the LED elements 221. Moreover, connection terminals 202 to 204 are formed on the mounting board 201. The wiring connected to the LED elements 211 and the LED elements 221 is connected to the driving circuit provided inside the outer case 260 and the base 270 of the LED lamp 2. It is to be noted that lead wires are soldered at the connection terminals 202 to 204 to be fixed to the mounting board 201.

The shape of the mounting board 201 is not limited to the true circle as shown in FIG. 2. The mounting board 201 may be, for example, rectangular or elliptical as described in Embodiment 3, corresponding to the shape of the LED lamp 2 to be mounted. Moreover, the layouts of the LED arrays 211A and 221A are not limited to the annular arrangement as shown in FIG. 2. The mounting board 201 may be, for example, a linear arrangement or an elliptical arrangement as described in Embodiment 3, corresponding to the shape of the LED lamp 2 to be mounted.

Furthermore, the surface of the mounting board 201 needs not be entirely flat if the LED elements can be arranged planarly. In addition, the back surface of the mounting board 201 is not limited to be a flat surface.

The LED module 10 is, for instance, screwed to the base platform. The LED module 10 may also be fixed to the base platform through adhesion or engagement.

Figure 3:
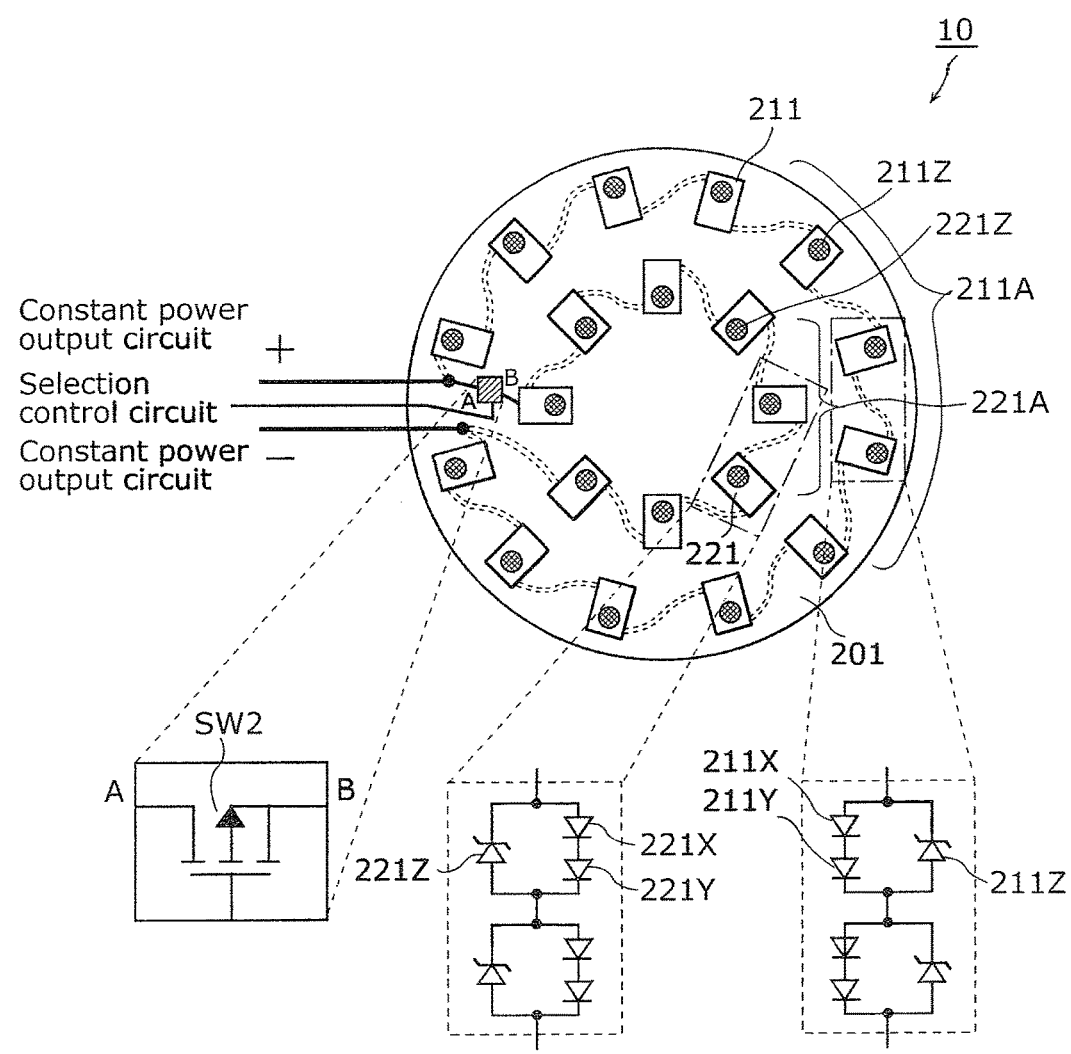
FIG. 3 is an exemplary layout view of components in the LED module according to Embodiment 1.

FIG. 3 is an exemplary layout view of components in the LED module according to Embodiment 1. The LED module 10 is a light-emitting module including: the LED array 211A; the LED array 221A having a different emission color from an emission color of the LED array 211A; and the FET switch SW2 provided in the second current path. The LED array 211A is the first light-emitting unit annularly arranged on the mounting board 201. The LED array 221A is the second light-emitting unit that is arranged within an inner circumference of the LED array 211A and emits light having a different emission color from an emission color of the LED array 211A.

Here, as shown in FIG. 3, each of the LED elements 211 that are the SMDs may include LED chips 211X and 211Y connected in series. Moreover, each LED element 211 may include a Zener diode 2112 connected in parallel to the LED chips 211X and 211Y. Likewise, each of the LED elements 221 that are the SMDs may include LED chips 221X and 221Y connected in series. Moreover, each LED element 221 may include a Zener diode 221Z connected in parallel to the LED chips 211X and 211Y. Here, for instance, the LED element 211 includes: the LED chips 211X and 211Y having a forward voltage Vf of 3 V; and the sealing component 214 containing the orange phosphor (with the color temperature of 2700 K), and emits light having incandescent color. Furthermore, for example, the LED element 221 includes: the LED chips 221x and 221Y having a forward voltage Vf of 3 V; and the sealing component 214 containing the white phosphor (with the color temperature of 6500 K), and emits light having daylight color.

The Zener diodes 211Z and 221Z are electrostatic breakdown protection elements that protect the LED chips 211X and 211Y and the LED chips 221X and 221Y from electrostatic breakdown, respectively. Specifically, for instance, if surge voltage is inputted to anode terminals of the LED arrays 211A and 221A, and a voltage greater than or equal to a threshold value is applied to anode terminals of the LED elements 211 and 221, conducting the Zener diodes 211Z and 221Z makes it possible to prevent breakdown of the LED chips 211X, 211Y, 221X, and 221Y caused by application of a high voltage to the LED chips 211X, 211Y, 221X, and 221Y. Moreover, the Zener diodes 211Z and 2212 are characterized by absorbing light emitted from the LED chips, and thus light distribution properties of the LED elements change depending on arranged positions in packages.

In the case of the configurations of the LED elements shown in FIG. 3, a voltage value obtained by adding a forward voltage Vf of each and every one of the LED chips connected in series and included in the LED array 211A is a first total forward voltage. In addition, a voltage value obtained by adding a forward voltage Vf of each and every one of the LED chips connected in series and included in the LED array 221A is a second total forward voltage. In this relationship, the first total forward voltage is greater than the second total forward voltage. Moreover, in this embodiment, the LED chips 211X, 211Y, 221X, and 221Y have an equal forward voltage, the number of the LED chips connected in series and included in the LED array 211A is twenty four, and the number of the LED chips connected in series and included in the LED array 221A is sixteen. In this relationship, the number of the LED chips connected in series and included in the LED array 211A is greater than the number of the LED chips connected in series and included in the LED array 221A. In other words, the LED arrays differ in total forward voltage, and in amount of voltage drop in the case where current flows through each of the LED arrays. With this, it is possible to selectively pass current to, among current paths of current flowing through the LED arrays, a current path having a small amount of voltage drop.

The LED chips 211X and 211Y and the Zener diode 211Z included in the LED element 211 are mounted on a mounting surface of the package 212. Here, the LED element 211 is disposed so that the Zener diode 211Z of the LED element 211 is located in an outer circumferential direction of the mounting board 201 relative to the LED chips 211X and 211Y of the LED element 211. The LED chips 221X and 221Y and the Zener diode 221Z included in the LED element 221 are mounted on the mounting surface of the package 212. Here, the LED element 221 is disposed so that the Zener diode 221Z of the LED element 221 is located in an inner circumferential direction of the mounting board 201 relative to the LED chips 221X and 221Y of the LED element 221. Consequently, the LED chips are arranged within the inner circumference relative to the Zener diodes 211Z in the LED array 211A annularly provided in the outer circumference region of the mounting board 201. In contrast, the LED chips are arranged within the outer circumference relative to the Zener diodes 221Z in the LED array 221A provided in the inner circumference region of the mounting board 201. With the above arrangement, the Zener diode 211Z absorbs part of light emitted toward the board outer circumferential direction in the LED element 211. Moreover, with the above arrangement, the Zener diode 221Z absorbs part of light emitted toward the board inner circumferential direction in the LED element 221. Thus, the light distribution properties of the LED array 211A and the LED array 221A can be approximated to each other more than the light distribution properties of the both arrays in the case where the locations of the Zener diodes are not considered. Accordingly, this enables, for instance, light distribution adjustment of the LED lamp 2 using one lens, and the optical mechanism can be simplified.

[Configuration of LED Lamp]

Figure 4:
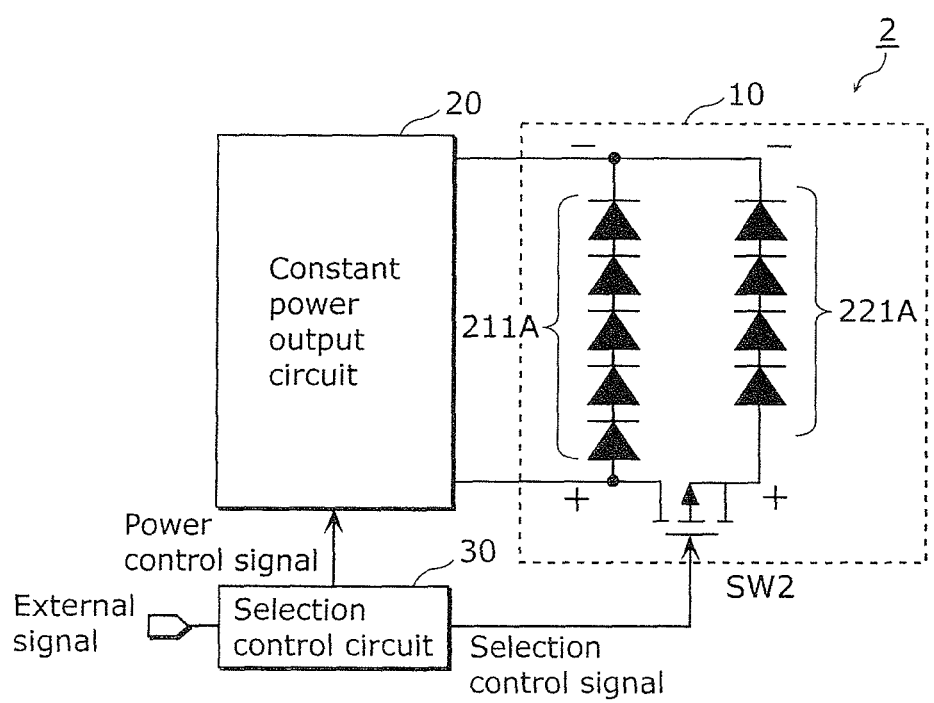
FIG. 4 is a block configuration diagram of the LED lamp according to Embodiment 1.

FIG. 4 is a block configuration diagram of the LED lamp according to Embodiment 1. As illustrated in FIG. 4, the LED lamp 2 includes the LED module 10, the constant power output circuit 20, and the selection control circuit 30. In addition, as illustrated in FIG. 2, the LED module 10 includes the LED array 211A, the LED array 221A, and the FET switch SW2.

As illustrated in FIG. 2, the LED array 211A is the first light-emitting unit that includes the LED elements 211 connected in series and has a first anode terminal and a first cathode terminal. The LED array 221A is the second light-emitting unit that includes the LED elements 221 connected in series, has a second anode terminal and a second cathode terminal, and emits light having a different color form an emission color of the first light-emitting unit. Moreover, the cathode terminal of the LED array 211A and the cathode terminal of the LED array 221A are connected, and the anode terminal of the LED array 211A and the anode terminal of the LED array 221A are connected via the FET switch SW2.

It is to be noted that although each LED element 211 and each LED element 221 both include, for instance, the LED chips having the equal forward voltage Vf in FIG. 2, the present invention is not limited to this. The LED element 211 and the LED element 221 both do not need to include the LED chips having the equal forward voltage Vf, and may differ in emission color as an array, and the total forward voltage of the LED array 211A may be greater than the total forward voltage of the LED array 221A.

In this embodiment, for example, the LED element 211 is a first light-emitting element that includes an LED chip having a forward voltage Vf of 3 V and a sealing component containing an orange phosphor, and emits light having incandescent color. The LED element 221 is a second light-emitting element that includes an LED chip having a forward voltage Vf of 3 V and a sealing component containing a white phosphor, and emits light having daylight color. Here, assuming that the LED array 211A includes 24 LED chips connected in series, a total Vf is 72 V (=3 V×24). Moreover, assuming that the LED array 221A includes 16 LED chips connected in series, a total Vf is 48 V (=3 V×16).

The FET switch SW2 is a first switch element that has a source terminal and a drain terminal connected between the first anode terminal and the second anode terminal, and switches between a first current path through which current flows to the first light-emitting unit and a second current path through which current flows to the second light-emitting unit. In other words, the FET switch SW2 has the source terminal and the drain terminal that are connected in series in the second current path having a less total forward voltage out of the first current path through which current flows from the constant power output circuit 20 to the LED array 211A and the second current path through which current flows from the constant power output circuit 20 to the LED array 221A. Moreover, the FET switch SW2 has a gate terminal to which the selection control circuit 30 applies a selection control signal.

Upon receiving an external signal, the selection control circuit 30 outputs a selection control signal and a power control signal to the FET switch SW2 and the constant power output circuit 20, respectively, based on the external signal.

The FET switch SW2 is a p-type FET that switches between ON and OFF according to the selection control signal inputted to the gate terminal. This switching allows the constant output circuit 20 to supply constant power to the LED array 211A or the LED array 221A.

The constant power output circuit 20 does not change an amount of power supplied to the LED module 10 by the on/off operation of the FET switch SW2, under a certain power control signal. To put it another way, the constant power output circuit 20 outputs the same power value to one of the LED array 211A and the LED array 221A through which current flows before conduction and non-conduction of the FET switch SW2 are switched, and the other of the LED array 211A and the LED array 221A through which current flows after the switching. In contrast, the constant power output circuit 20 controls an amount of power supplied to the LED module 10, by duty adjustment based on the PWM technique, for example, according to the power control signal from the selection control circuit 30.

Stated differently, the LED lamp 2 is capable of maintaining brightness and an amount of power relative to the switching between emission colors. In addition, the LED lamp 2 has a function to vary the brightness and the amount of power according to an external (light adjustment) signal.

It is to be noted that although this embodiment exemplifies the configuration in which the two LED arrays are connected in parallel, a configuration in which three or more LED arrays are connected in parallel may be used. For instance, in the case of a configuration in which an n number of LED arrays are connected in parallel, each of the n number of the LED arrays may have different total Vf, and an FET switch may be connected in series between the anode terminals of adjacent LED arrays among the n number of the LED arrays. Note that the FET switch is not provided in a current path passing through an LED array having the greatest total Vf among the n number of the LED arrays. In short, in the case of the configuration in which the n number of the LED arrays are connected in parallel, an (n−1) number of FET switches is necessary.

Figure 5A:
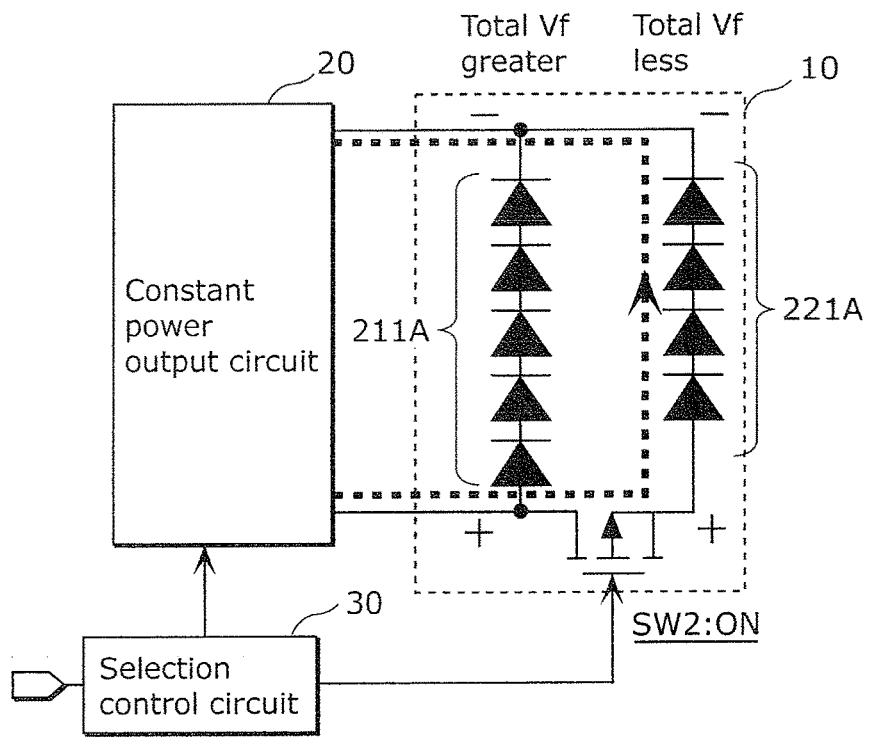
FIG. 5A is a state transition diagram illustrating a current path in the case where a FET switch of the LED lamp according to Embodiment 1 is in the ON state.
Figure 5B:
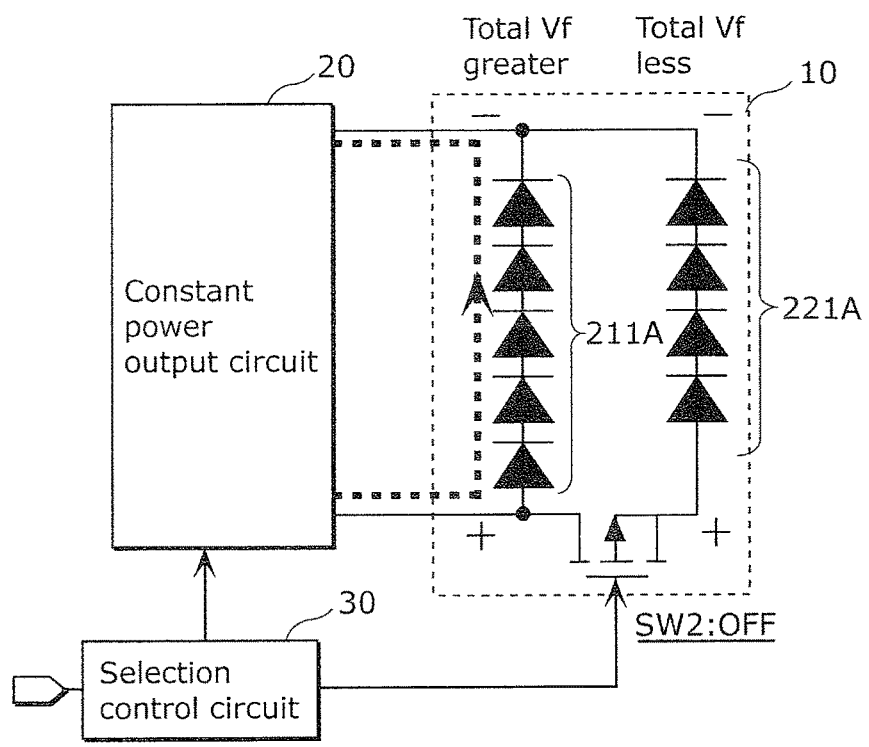
FIG. 5B is a state transition diagram illustrating a current path in the case where the FET switch of the LED lamp according to Embodiment 1 is in the OFF state.

The following describes a relationship between the on/off operation of the FET switch SW2 and a current path with reference to FIG. 5A and FIG. 5B.

FIG. 5A is a state transition diagram illustrating a current path in the case where the FET switch of the LED lamp according to Embodiment 1 is in the ON state. FIG. 5B is a state transition diagram illustrating a current path in the case where the FET switch of the LED lamp according to Embodiment 1 is in the OFF state. Here, as stated above, the LED array 211A has the total forward voltage (hereinafter may be referred to as total Vf) of 72 V, the LED array 221A has the total forward voltage of 48 V, and the difference between the total forward voltages is 24 V.

In the above configuration, first, in the case where the FET switch SW2 is in the ON state according to a selection control signal, current supplied from the constant power output circuit 20 flows through the current path passing through the LED array 221A having the less total Vf, and the LED array 221A emits light having daylight color. In other words, in the case where the difference in total Vf between the LED arrays is greater than or equal to 4 V, and the FET switch SW2 is conductive, the constant power output circuit 20 supplies power only to the LED array 221A.

In contrast, in the case where the FET switch SW2 is in the OFF state according to a selection control signal, the current path passing through the LED array 221A is blocked, current supplied from the constant power output circuit 20 flows through the current path passing through the LED array 211A, and the LED array 211A emits light having incandescent color.

Here, for example, the phosphors of the LED array 211A have low luminous efficiency, and the phosphors of the LED array 221A have high luminous efficiency. To connect both the LED arrays 211A and 221A to the constant power output circuit 20 and drive the LED arrays 211A and 221A at the same illuminance, the number of the LED elements connected in series and included in each of the arrays is adjusted such as increasing the number of the LED elements of the LED array 211A having lower luminous efficiency. In this embodiment, the LED array 211A has the greater number of the LED elements connected in series, and thus the emission colors can be switched while the LED array 211A and the LED array 221A have the same illuminance.

Moreover, the LED array 211A having the low luminous efficiency and the greater number of the LED elements has a larger amount of heat generation, but the arrangement of the LED array 211A in the out circumferential region of the mounting board 201 makes it possible to enhance radiation properties.

In the case where the current flows through the above two current paths, and even if the FET switch SW2 switches between the current paths in a situation where the power control signal is constant, the constant power output circuit 20 is capable of providing the same power value to the LED array 211A and the LED array 221A.

Furthermore, since a circuit element that switches between the current paths of the LED arrays is only the FET switch SW2, it is possible to reduce the number of circuit components, and switch between the emission colors without changing the brightness and the power consumption.

It is to be noted that if the total Vf of the LED array 211A is greater than the total Vf of the LED array 221A by at least 4 V in the state transition of FIG. 5A, it is possible to pass the current to the LED array 221A completely.

In contrast, if the total forward voltage of the LED array 211A is greater than the total forward voltage of the LED array 221A by at least 2 V but less than 4 V, since current dominantly flows through the LED array 221A while very little current flows through the LED array 211A, it is possible to mix the emission colors. To put it another way, in the case where the FET switch SW2 is in the conduction state, the constant power output circuit 20 supplies main power to the LED array 221A, and power less than the main power to the LED array 211A. In this case, the constant power output circuit 20 outputs power to the LED array 211A and the LED array 221A without changing a total value of power supplied to the LED array 211A and the LED array 221A between before and after conduction and non-conduction of the FET switch SW2 are switched.

[Circuit Configuration of LED Lamp]

Next, the circuit configuration of the LED lamp 2, and especially the circuit configuration of the constant power output circuit 20, are described with reference to FIG. 6.

Figure 6:
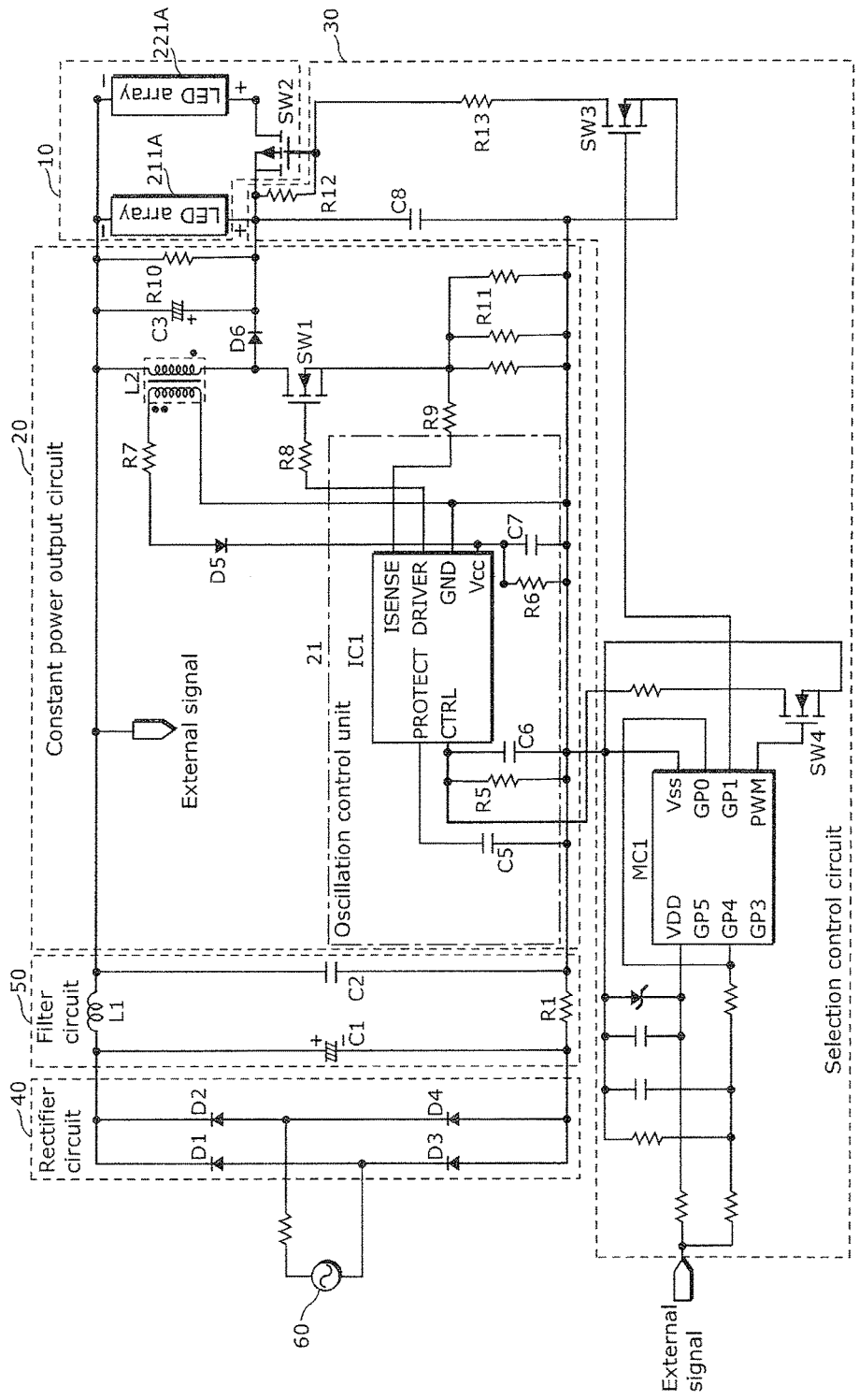
FIG. 6 is a circuit configuration diagram including the LED lamp according to Embodiment 1.

FIG. 6 is a circuit configuration diagram including the LED lamp according to Embodiment 1. FIG. 6 illustrates the LED module 10, the constant power output circuit 20, the selection control circuit 30, a rectifier circuit 40, a filter circuit 50, and an alternating-current (AC) source 60. The constant power output circuit 20, the selection control circuit 30, the rectifier circuit 40, and the filter circuit 50 constitute a drive circuit that drives the LED module 10. The LED lamp 2 includes the drive circuit and the LED module 10.

The AC source 60 outputs, for instance, alternating current having a voltage effective value of 100 V.

The rectifier circuit 40 includes, for example, a diode bridge having four diodes D1 to D4.

The filter circuit 50 smoothes, using an electrolytic capacitor C1, current rectified by the rectifier circuit 40, and filters the current into a predetermined frequency.

The constant power output circuit 20 includes a buck-boost circuit in which a primary coil of a transformer L2 is connected in parallel to the LED arrays 211A and 221A and a FET switch SW1 is connected in series to the primary coil of the transformer L2. The current supplied to the constant power output circuit 20 via the rectifier circuit 40 and the filter circuit 50 is stored as magnetic energy in the transformer L2. Moreover, the constant power output circuit 20 releases the magnetic energy stored in the transformer L2 to the LED module 10 with predetermined timing.

The selection control circuit 30 includes a microcontroller MC1 and FET switches SW3 and SW4. For instance, upon receiving an external signal for causing the LED array 221A to emit light, the microcontroller MC1 outputs a selection control signal for turning the FET switch SW3 ON, to a gate of the FET switch SW3. With this, the FET switch SW3 is turned ON, a gate voltage of the FET switch SW2 of p-type is pulled down, and the FET switch SW2 is turned ON. Thus, the current supplied to the LED module 10 selectively flows through the current path passing through the LED array 221A. In contrast, upon receiving an external signal for causing the LED array 211A to emit light, the microcontroller MC1 outputs a selection control signal for turning the FET switch SW3 OFF, to the gate of the FET switch SW3. With this, the FET switch SW3 is turned OFF, a gate voltage of the FET switch SW2 of p-type changes to a high level, and the FET switch SW2 is turned OFF. Thus, the current supplied to the LED module 10 selectively flows through the current path passing through the LED array 211A.

In addition to the above, for example, upon receiving an external signal for varying the brightness (illuminance) of the LED module 10, the microcontroller MC1 outputs a signal for controlling an on/off operation of the FET switch SW3, to a gate of the FET switch SW4. With this, the FET switch SW4 is turned ON or OFF at predetermined intervals, and thus an output control signal for controlling an oscillation frequency of the FET switch SW1 is provided to IC1 of an oscillation control unit 21.

In other words, the FET switch SW3 is a switch element for switching between emission colors, and the FET switch SW4 is a switch element for switching between illuminance.

[Configuration and Operation of Constant Power Output Circuit]

The constant power output circuit 20 includes the transformer L2, the FET switch SW1, a diode D6, a resistor R9, and the oscillation control unit 21. The oscillation control unit 21 includes the IC1 that controls conduction and non-conduction of the FET switch SW1. The following describes a connection relationship of each of the structural elements.

The primary coil of the transformers L2 has a high potential terminal connected to a drain terminal of the FET switch SW1. The constant power output circuit 20 connected to the rectifier circuit 40 and the filter circuit 50 has a positive input terminal connected to a low potential terminal of the primary coil of the transformer L2 (a negative output terminal of the constant power output circuit 20). The FET switch SW1 has a source terminal connected via a resistor R11 to a negative input terminal of the constant power output circuit 20 connected to the rectifier circuit 40 and the filter circuit 50. The resistor R9 is inserted in series between the source terminal of the FET switch SW1 and an ISENSE terminal of the IC1. A secondary coil of the transformer L2 supplies a power supply voltage Vcc of the IC1 via a resistor R7 and a diode D5. The primary coil of the transformer L2 has the high potential terminal connected to an anode terminal of the diode D6, and the diode D6 has a cathode terminal (a positive output terminal of the constant power output circuit 20) connected to the anode terminal of the LED array 211A. The primary coil of the transformer L2 has the low potential terminal connected to the cathode terminal of the LED array 211A. It is to be noted that in this embodiment the transformer L2 has inductance of 0.8 mH, for example.

To put it another way, the primary coil of the transformer L2 is an inductor that is connected in parallel to the LED array 211A and in parallel to a series-connected portion of the LED array 221A and the FET switch SW2. The FET switch SW1 is a second switch element connected in series to the transformer L2 between the positive input terminal and the negative input terminal of the constant power output circuit 20. The constant power output circuit 20 has the negative output terminal connected to the cathode terminals of the LED arrays 211A and 221A, and the positive output terminal connected to the anode terminal of the LED array 211A and the FET switch SW2. The constant power output circuit 20 outputs the same power value to the LED array 211A and the LED array 221A through which the current flows before and after the conduction and non-conduction of the FET switch SW2 are switched.

The following describes in detail a relationship between a switching operation of the FET switches SW1 and SW2 and a light-emitting operation of the LED module 10 in the above circuit configuration.

First, the FET switch SW2 is in the OFF state at time t0. Moreover, the FET switch SW1 is in the ON state, and current rectified and smoothed by the rectifier circuit 40 and the filter circuit 50 flows through the transformer L2 (primary side), the FET switch SW1, and the resistor R11. Meanwhile, magnetic energy stored in the transformer L2 increases due to power supply from a power source. At this time, the IC1 monitors the current flowing through the transformer L2, using the resistor R9. Since the cathode terminals of the LED arrays 211A and 221A are connected to the positive input terminal (negative output terminal) of the constant power output circuit 20, when the transformer L2 is charged, the current does not flow through the LED arrays 211A and 221A.

Next, when the current flowing through the transformer L2 reaches a predetermined current value, the IC1 turns the FET switch SW1 OFF at time t1. At this time, the power supply from the power source is cut off, the magnetic energy stored in the transformer L2 is released to a current path from the transformer L2 (primary side) to the diode D6 to the LED array 211A to the transformer L2 (primary side), and the LED array 211A emits light.

Next, the IC1 turns the FET switch SW1 ON at time t2. With this, the power supply from the power source to the transformer L2 is started, the magnetic energy stored in the transformer L2 increases, and the LED array 211A stops emitting the light.

The IC1 determines, based on a power control signal from the selection control circuit 30, a duty cycle that is a ratio between an ON period (t0 to t1) and an OFF period (t1 to t2) of the FET switch SW1, and controls the FET switch SW1 using pulse-width modulation. Constant power is supplied to the LED module 10 by repeatedly turning the FET switch SW1 ON and OFF according to the duty cycle, and the LED module 10 emits light at predetermined illuminance. Here, power corresponding to the magnetic energy stored in the transformer L2 is supplied to the LED array 211A in a period when the FET switch SW2 is in the OFF state. It is to be noted that in this embodiment the FET switch SW1 has a switching frequency of 66.5 kHz, for instance.

Next, an external signal for switching between emission colors is inputted to the selection control circuit 30 at time t3. At this time, the FET switch SW3 changes to the ON state, and thus the FET switch SW2 changes to the ON state.

Next, when the current flowing through the transformer L2 reaches a predetermined current value, the IC1 turns the FET switch SW1 OFF at time t4. At this time, the power supply from the power source is cut off, the magnetic energy stored in the transformer L2 is released to the current path from the transformer L2 (primary side) to the diode D6 to the LED array 221A to the transformer L2 (primary side), and the LED array 221A emits light.

Next, the IC1 turns the FET switch SW1 ON at time t5. With this, the power supply from the power source to the transformer L2 is started, the magnetic energy stored in the transformer L2 increases, and the LED array 221A stops emitting the light.

Between the time t3 and the time t5, the IC1 controls, based on the same power control signal as the power control signal in the period between the time 0 and the time t3, the FET switch SW1 with the same duty cycle as the duty cycle between the time t0 and the time t2, using pulse-width modulation. The LED module 10 is set to the same illuminance as the illuminance between the time t0 and the time t3 based on the duty cycle. Here, the same power as the power supplied to the LED array 211A in the period when the FET switch SW2 is in the OFF state is supplied to the LED array 221A in a period when the FET switch SW2 is in the ON state.

In other words, if the FET switch SW1 is in the conduction state, the transformer L2 is charged with the current flowing from the power source to the primary coil of the transformer L2, and if the FET switch SW1 is in the non-conduction state, the magnetic energy stored in the primary coil of the transformer L2 by the charging is released to the LED array 211A or the LED array 221A. Moreover, by providing a capacitor C3 in parallel to the LED array 211A, it is possible to smooth the current flowing through the LED array, and reduce a variation in optical output.

In the above configuration and operation, the LED lamp 2 according to this embodiment uses the constant power output circuit instead of the constant current circuit used as a drive circuit of the conventional lighting source, and thus the power corresponding to only the predetermined amount of the magnetic energy stored in the transformer L2 is supplied to the LED array. Therefore, even if amounts of voltage drop of the current paths provided to the LED module 10 differ, the power supplied to each LED array is constant.

It is to be noted that according to the constant power output circuit 20 that is buck-boost, the magnetic energy is continuously stored during the period when the FET switch SW1 is ON, and thus it is possible to sufficiently supply power to an LED array having a greater total forward voltage.

It is to be noted that although the FET switch SW2 is disposed on a high potential side of the LED arrays 211A and 221A in the circuit configuration of the LED module 10, the FET switch SW2 may be disposed on a low potential side of the LED arrays 211A and 221A.

It is to be noted that although the drive circuit included in the LED lamp 2 uses the FET as the switch element in this embodiment, the drive circuit may use a bipolar transistor.

Figure 7:
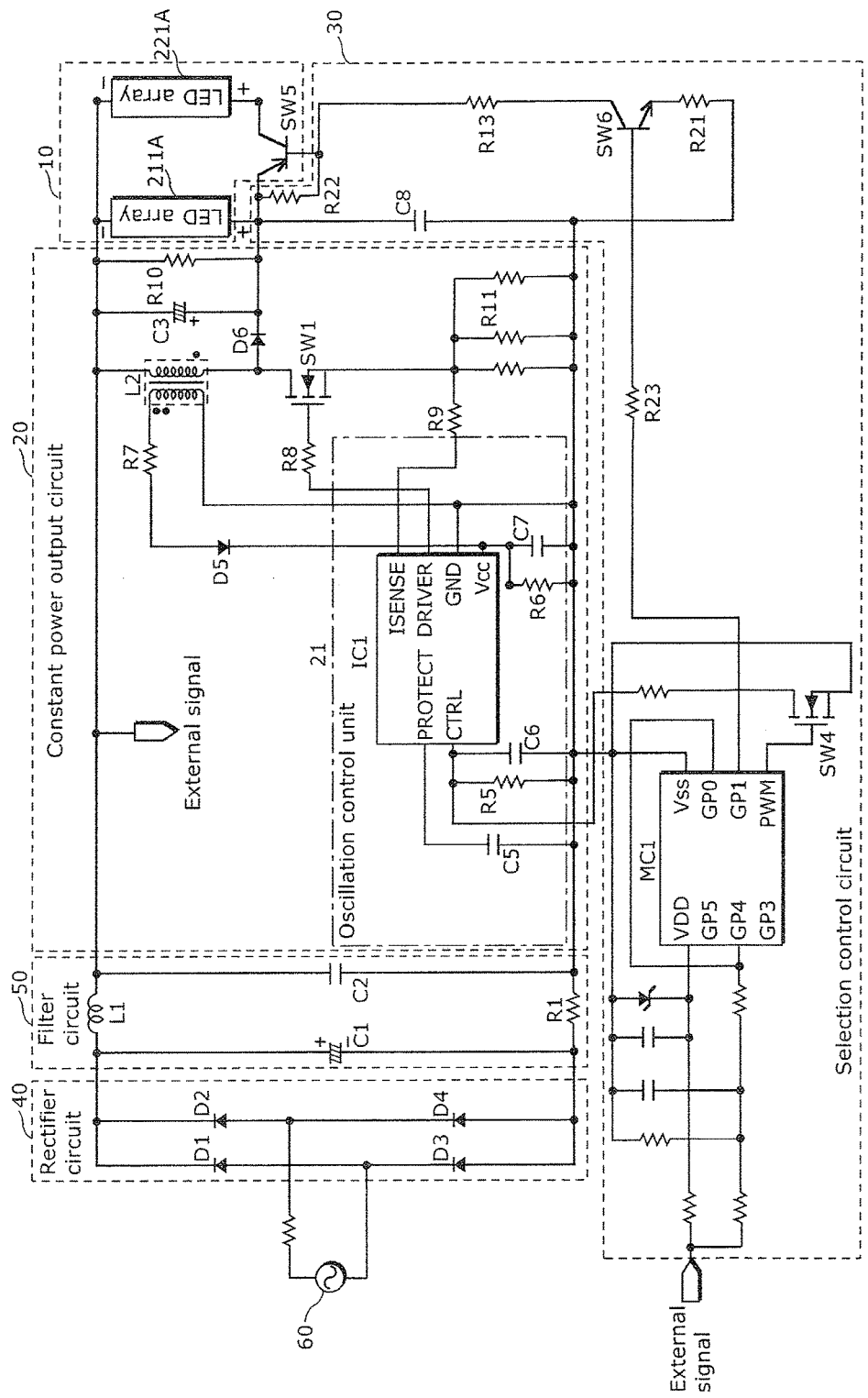
FIG. 7 is a circuit configuration diagram including an LED lamp according to a modification of Embodiment 1.

FIG. 7 is a circuit configuration diagram including an LED lamp according to a modification of Embodiment 1. A configuration of a drive circuit illustrated in FIG. 7 differs from the configuration of the drive circuit illustrated in FIG. 6 in that a PNP bipolar transistor SW5 instead of the FET switch SW2 is provided as a switch element of the LED module 10 and in that an NPN bipolar transistor SW6 instead of the FET switch SW3 is provided as a switch element of the selection control circuit 30.

For instance, upon receiving an external signal for causing the LED array 221A to emit light, the microcontroller MC1 outputs a selection control signal for passing a base-emitter current of the bipolar transistor SW6, to a base of the bipolar transistor SW6. With this, the bipolar transistor SW6 is turned ON, and an emitter-base current of the PNP bipolar transistor SW5 and an emitter-collector current of the bipolar transistor SW flow due to a collector-emitter current of the bipolar transistor SW6. Thus, the current supplied to the LED module 10 selectively flows through the current path passing through the LED array 221A. In contrast, upon receiving an external signal for causing the LED array 211A to emit light, the microcontroller MC1 outputs a selection control signal for turning the bipolar transistor SW6 OFF, to the base of the bipolar transistor SW6. With this, the bipolar transistor SW6 is turned OFF, and the bipolar transistor SW5 is also turned OFF. Thus, the current supplied to the LED module 10 selectively flows through the current path passing through the LED array 211A.

As described above, in the LED lamp 2 according to this embodiment, (1) among the two LED arrays each having the different emission color, the LED array 211A having the greater number of the LED elements connected in series has the greater total forward voltage, (2) the constant power output circuit 20 supplies the constant power to the LED array, and (3) the first switch element switches between the current paths of the LED arrays. With this, it is possible to switch between the emission colors without changing the brightness and the power consumption. Moreover, since the LED array 211A having the greater number of the LED elements connected in series is annularly provided in the outer circumferential region of the mounting board 201, for instance, only providing one lens above the mounting board 201 enables the light distribution adjustment, and the optical mechanism can be simplified.

Embodiment 2

Hereinafter, an LED lamp according to Embodiment 2 is described with reference to the drawings. It is to be noted that the description of the same configuration as the LED lamp 2 according to Embodiment 1 is omitted, and different configurations from the LED lamp 2 are mainly described below.

[Configuration of LED Module]

Figure 8:
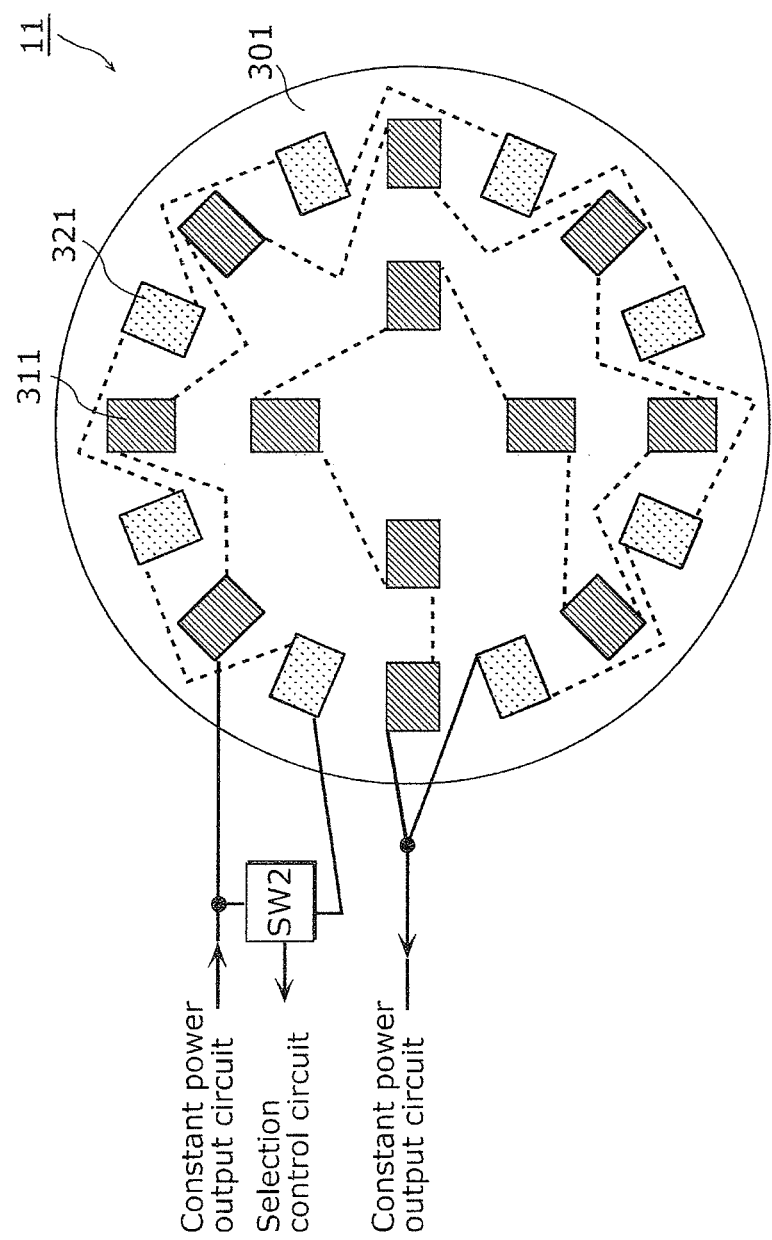
FIG. 8 is an exemplary LED layout view in an LED module according to Embodiment 2.

FIG. 8 is an exemplary layout view of components in the LED module according to Embodiment 2. An LED module 11 according to this embodiment is attached to the LED lamp 2 shown in FIG. 1.

The LED module 11 is a light-emitting module including: LED elements 311; LED elements 321 having a different emission color from an emission color of the LED elements 311; the FET switch SW2 provided in a second current path through which current flows to the LED elements 321.

The LED elements 311 are annularly arranged in an outer circumferential region on a mounting board 301, and are connected in series to each other. Moreover, the LED elements 311 are also arranged in an inner circumferential region on the mounting board 301. The LED elements 311 annularly arranged in the outer circumferential region on the mounting board 301 and the LED elements 311 arranged in the inner circumferential region on the mounting board 301 are connected in series to form an LED array 311A.

The LED elements 321 are annularly arranged in the outer circumferential region on the mounting board 301, and are connected in series to each other. The LED elements 321 annularly arranged in the outer circumferential region on the mounting board 301 constitute an LED array 321A.

Furthermore, the LED elements 311 and the LED elements 321 annularly arranged in the outer circumferential region on the mounting board 301 are alternately arranged along an outer circumference of the mounting board 301.

Each of the LED elements 311 is, for instance, a first light-emitting element which includes an LED chip having a forward voltage Vf of 3 V and a sealing component containing an orange phosphor (with a color temperature of 2700 K) and which emits light having incandescent color. Each of the LED elements 321 is, for instance, a second light-emitting element which includes an LED chip having a forward voltage Vf of 3 V and a sealing component containing a white phosphor (with a color temperature of 6500 K) and which emits light having daylight color.

Here, a first total forward voltage that is a voltage value obtained by adding a forward voltage of each and every one of the LED elements 311 connected in series is greater than a second total forward voltage that is a voltage value obtained by adding a forward voltage of each and every one of the LED elements 321 connected in series. In this embodiment, the forward voltages of the LED elements 311 are equal to those of the LED elements 321, and the number of the LED elements connected in series (twelve) is greater than that of the LED elements 321 connected in series (eight).

It is to be noted that the configuration of the LED lamp excluding the configuration of the above LED module 11 is the same as the configuration described in Embodiment 1.

As described above, in the LED lamp according to this embodiment, (1) among the two LED arrays each having the different emission color, the LED array 311A having the greater number of the LED elements connected in series has the greater total forward voltage, (2) the constant power output circuit 20 supplies the constant power to the LED array, and (3) the first switch element switches between the current paths of the LED arrays. With this, it is possible to switch between the emission colors without changing the brightness and the power consumption. Moreover, the LED array 311A having the greater number of the LED elements connected in series is provided in the outer circumferential region and the inner circumferential region of the mounting board 301, and the LED array 321A having the less number of the LED elements connected in series is provided in the outer circumferential region of the mounting board 301. With this layout, for example, only providing one lens above the board enables the light distribution adjustment, and the optical mechanism can be simplified.

Embodiment 3

Hereinafter, an LED lamp according to Embodiment 3 is described with reference to the drawings. It is to be noted that the description of the same configuration as the LED lamp 2 according to Embodiment 1 is omitted, and different configurations from the LED lamp 2 are mainly described below.

[Configuration of LED Module]

Figure 9:
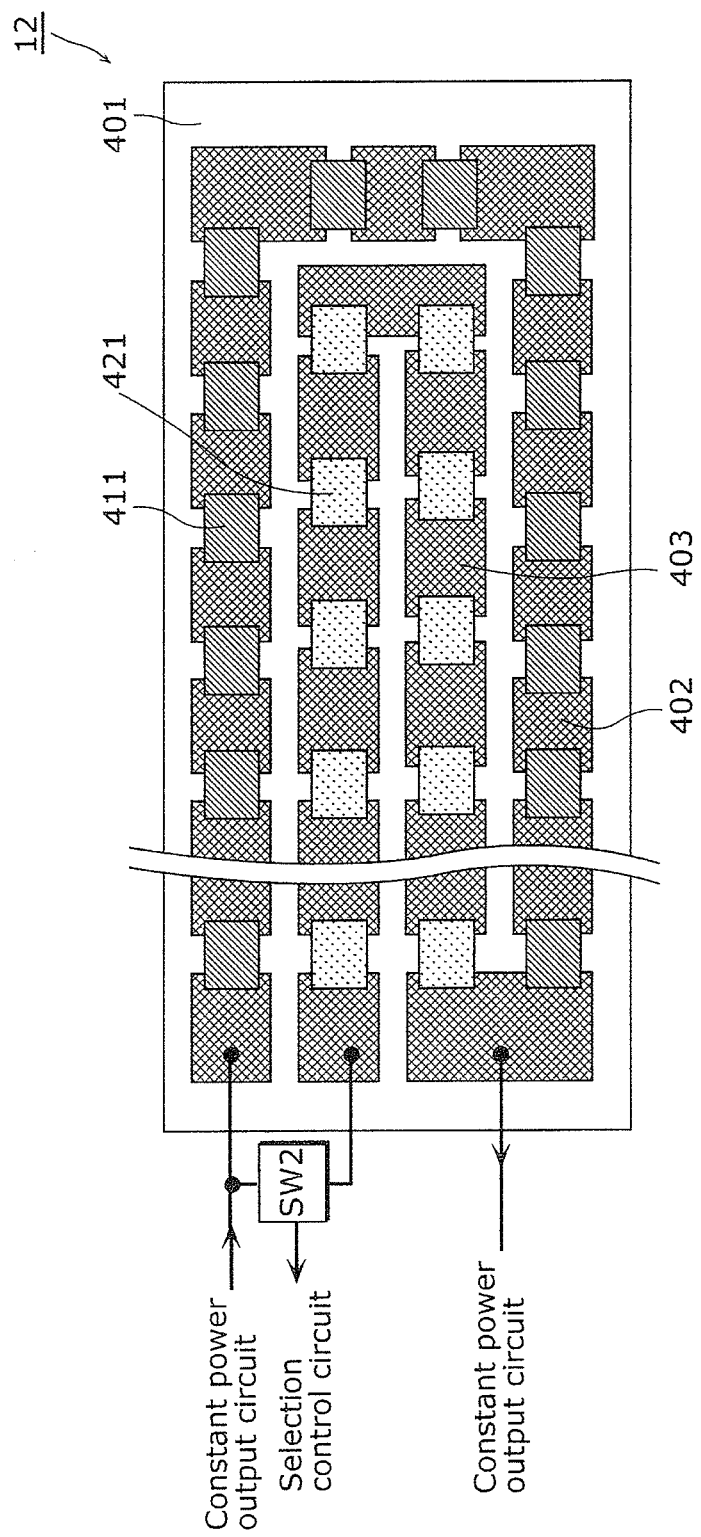
FIG. 9 is an exemplary LED layout view in an LED module according to Embodiment 3.
Figure 10:
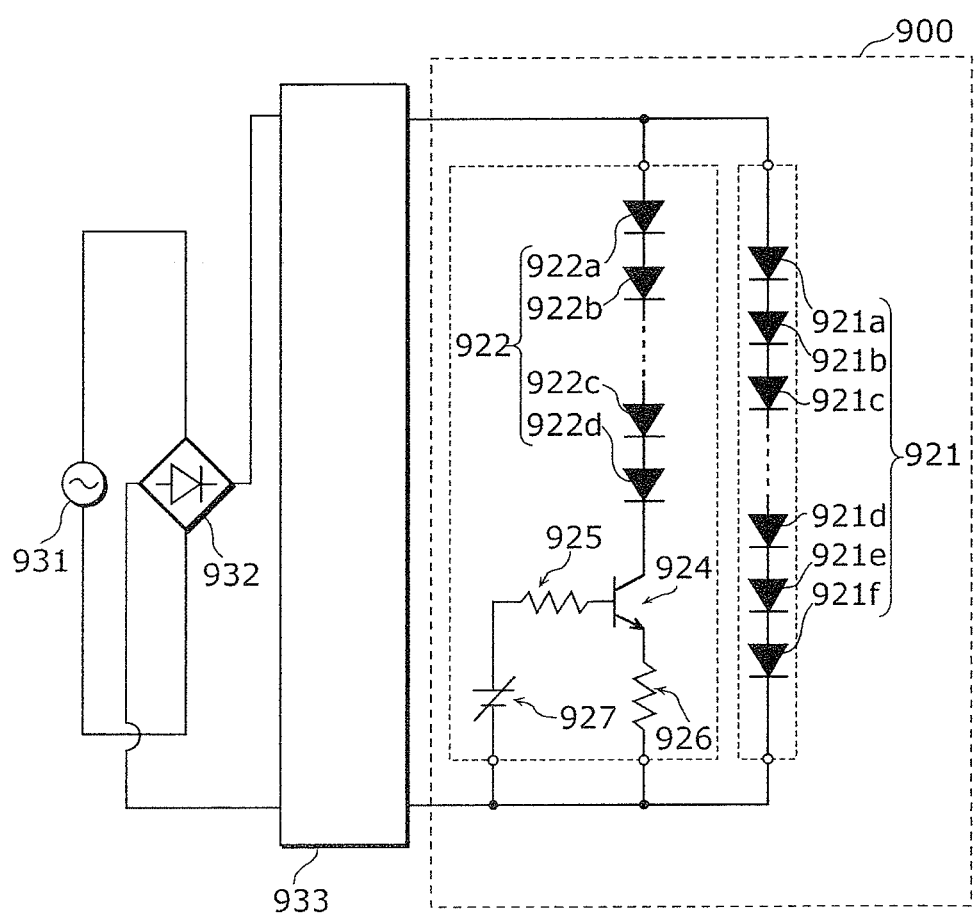
FIG. 10 is a circuit diagram of a conventional LED module disclosed in PTL 1.

FIG. 9 is an exemplary layout view of components in an LED module according to Embodiment 3. An LED module 12 according to this embodiment is attached to the LED lamp 2 shown in FIG. 1. Alternatively, the LED module 12 according to this embodiment is attached as a light-emitting module of a straight tube LED lamp.

The LED module 12 is a light-emitting module including: LED elements 411; LED elements 421 having a different emission color from an emission color of the LED elements 411; the FET switch SW2 provided in a second current path through which current flows to the LED elements 421.

The LED elements 411 are arranged in an outer circumferential region on a rectangular mounting board 401 in conformity to the rectangular shape, and are connected in series to each other by a wiring pattern 402. The LED elements 411 arranged in the outer circumferential region on the mounting board 401 constitute an LED array 411A.

The LED elements 421 are arranged in an inner circumferential region on the rectangular mounting board 401, and are connected in series to each other by a wiring pattern 403. The LED elements 421 arranged in the inner circumferential region on the mounting board 401 constitute an LED array 421A.

Each of the LED elements 411 is, for instance, a first light-emitting element which includes an LED chip having a forward voltage Vf of 3 V and a sealing component containing an orange phosphor (with a color temperature of 2700 K) and which emits light having incandescent color. Each of the LED elements 421 is, for instance, a second light-emitting element which includes an LED chip having a forward voltage Vf of 3 V and a sealing component containing a white phosphor (with a color temperature of 6500 K) and which emits light having daylight color.

Here, a first total forward voltage that is a voltage value obtained by adding a forward voltage of each and every one of the LED elements 411 connected in series is greater than a second total forward voltage that is a voltage value obtained by adding a forward voltage of each and every one of the LED elements 421 connected in series. Moreover, the forward voltages of the LED elements 411 are equal to those of the LED elements 421, and the number of the LED elements 411 connected in series is greater than the number of the LED elements 421 connected in series.

It is to be noted that the configuration of the constant power output circuit 20 connected to the above LED module 12 is the same as the configuration described in Embodiment 1.

As described above, in the LED lamp according to this embodiment, (1) among the two LED arrays each having the different emission color, the LED array 411A having the greater number of the LED elements connected in series has the greater total forward voltage, (2) the constant power output circuit 20 supplies the constant power to the LED array, and (3) the first switch element switches between the current paths of the LED arrays. With this, it is possible to switch between the emission colors without changing the brightness and the power consumption. Moreover, since the LED array 411A having the greater number of the LED elements connected in series is provided in the outer circumferential region of the mounting board 401 in conformity to the board shape, and the LED array 421A having the less number of the LED elements connected in series is provided in the inner circumferential region of the mounting board 401, a combination of the light distribution properties of the both LED arrays is made readily, and the optical mechanism can be simplified.

Although the lighting source and the lighting apparatus according to one aspect of the present invention have been described based on Embodiments 1 to 3, the present invention is not limited to these embodiments. The herein disclosed subject matter is to be considered descriptive and illustrative only, and the appended Claims are of a scope intended to cover and encompass not only the particular embodiments disclosed, but also equivalent structures, methods, and/or uses.

Moreover, although the packaged LED elements that are the SMDs are used as the LED module in Embodiments 1 to 3, the present invention is not limited to this. For instance, a chip-on-board LED module having LED chips directly mounted on a mounting board and collectively sealed with a phosphor-containing resin (sealing component) may be the LED module.

Furthermore, although, for example, the LED elements connected in series are assumed as the configuration of each LED array in Embodiments 1 to 3, the LED array may include one LED element. In this case, however, it is required that the LED elements each have a different forward voltage and different light-emitting characteristics.

Moreover, although the LED array which emits the light having the daylight color and the LED array which emits the light having the incandescent color are switched in the above embodiments, the present invention is not limited to this. For instance, three LED arrays which respectively emit red light, green light, and blue light may be switched without changing brightness and power consumption.

Furthermore, although the LED module is applied to the bulb-shaped lamp and the straight tube LED lamp in the embodiments, the present invention is not limited to this. For example, the LED module may be also applied to a ceiling light and a halogen lamp.

Moreover, the lighting apparatus 1 includes the LED lamp 2, but may include two or more LED lamps 2.

The circuit configurations in the above circuit diagrams are shown as examples. The present invention is not limited to the examples. More specifically, the present invention also includes a circuit which achieves the characteristic functions of the present invention in the similar manner to the above circuit configurations. For example, the present invention includes a circuit in which an element is connected to another element such as a transistor, a resistive element, a capacitive element, and an inductive element in series or in parallel, in a range which allows the functions similar to those of the above circuit configurations. In other words, the expression "is (are) connected" in the above embodiments is not limited to the case where two terminals (nodes) are directly connected, but also includes the case where the two terminals (nodes) are connected via an element in a range which allows the similar functions.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting source comprising:
   a board;
   a first light-emitting unit annularly arranged on the board and including a plurality of first light-emitting elements connected in series;
   a second light-emitting unit arranged within an inner circumference of the first light-emitting unit on the board and including a plurality of second light-emitting elements connected in series, the second light-emitting unit being configured to emit light having a different emission color from an emission color of the first light-emitting unit;
   a first switch element arranged in series on a second current path, of a first current path and a second current path, current flows to the first light-emitting unit through the first current path, and current flows to the second light-emitting unit through the second current path; and
   a constant power output circuit that outputs power to the first light-emitting unit and the second light-emitting unit without changing a total value of the power supplied to the first light-emitting unit and the second light-emitting unit before and after switching of the first switch element between conduction and non-conduction states,
   wherein the number of the plurality of first light-emitting elements connected in series is greater than the number of the plurality of second light-emitting elements connected in series, and
   a first total forward voltage is greater than a second total forward voltage, the first total forward voltage being a voltage value obtained by adding a forward voltage of each one of the plurality of first light-emitting elements connected in series, and the second total forward voltage being a voltage value obtained by adding a forward voltage of each one of the plurality of second light-emitting elements connected in series.

2. The lighting source according to claim 1,
wherein the forward voltage of each of the plurality of first light-emitting elements is equal to the forward voltage of each of the plurality of second light-emitting elements,
each first light-emitting element and each second light-emitting element include, on respective surfaces thereof, phosphors different from each other, and
the first light-emitting unit has a lower luminous efficiency than a luminous efficiency of the second light-emitting unit.

3. The lighting source according to claim 2,
wherein a light emission amount of the first light-emitting unit is equal to light emission amount of the second light-emitting unit.

4. The lighting source according to claim 1,
wherein the plurality of first light-emitting elements and the plurality of second light-emitting elements each include:
an LED chip that emits light by current flowing therethrough;
an electrostatic breakdown protection element connected in parallel to the LED chip;
a phosphor around the LED chip; and
a package containing the LED chip and the electrostatic breakdown protection element,
the electrostatic breakdown protection element of each of the plurality of first light-emitting elements is disposed in an outer circumferential direction relative to the LED chip of each of the plurality of first light-emitting elements, and
the electrostatic breakdown protection element of each of the plurality of second light-emitting elements is disposed in an inner circumferential direction relative to the LED chip of each of the plurality of second light-emitting elements.

5. The lighting source according to claim 1,
wherein the first switch element is connected in series between one of a first anode terminal of the first light-emitting unit and a second anode terminal of the second light-emitting unit and between a first cathode terminal of the first light-emitting unit and a second cathode terminal of the second light-emitting unit, and
the constant power output circuit has a negative output terminal connected to the first cathode terminal and one of the second cathode terminal and the first switch element connected to the second cathode terminal, and a positive output terminal connected to the first anode terminal and one of the second anode terminal and the first switch element connected to the second anode terminal.

6. The lighting source according to claim 1,
wherein the first current path bypasses the first switch element,
the second current path passes through the first switch element,
when the first switch element is in a non-conduction state, the constant power output circuit supplies power only to the first light-emitting unit of the first light-emitting unit and the second light-emitting unit, and
when the first switch element is in a conduction state, the constant power output circuit supplies main power to the second light-emitting unit.

7. The lighting source according to claim 6,
wherein the first total forward voltage and the second total forward voltage have a difference of at least 4 V, and
when the first switch element is in the conduction state, the constant power output circuit supplies power only to the second light-emitting unit of the first light-emitting unit and the second light-emitting unit.

8. The lighting source according to claim 6,
wherein the first total forward voltage and the second total forward voltage have a difference of at least 2 V and less than 4 V, and
when the first switch element is in the conduction state, the constant power output circuit supplies main power to the second light-emitting unit, and power less than the main power to the first light-emitting unit.

9. The lighting source according to claim 1,
wherein the constant power output circuit includes:
an inductor that is connected in parallel to the first light-emitting unit and in parallel to a series-connected portion of the second light-emitting unit and the first switch element;
a second switch element connected in series to the inductor between a positive input terminal and a negative input terminal of the constant power output circuit; and
an oscillation controller configured to control conduction and non-conduction states of the second switch element,
when the second switch element is in a conduction state, the inductor is charged with current flowing from a power source to the inductor, and
when the second switch element is in a non-conduction state, magnetic energy stored in the inductor by the charging is released to either one of the first light-emitting unit and the second light-emitting unit.

10. The lighting source according to claim 1,
wherein the first light-emitting unit has an emission color that is incandescent color, and
the second light-emitting unit has an emission color that is daylight color.

11. A lighting apparatus comprising the lighting source according to claim 1.

* * * * *